Patented Dec. 29, 1942

2,306,411

UNITED STATES PATENT OFFICE 2,306,411

DIENE COPOLYMERS AND METHOD OF PREPARING SAME

Frank K. Schoenfeld, Silver Lake, Ohio, assignor to The B. F. Goodrich Company, New York, N. Y., a corporation of New York No Drawing. Application October 16, 1940, Serial No. 361,387

22 Claims. (Cl. 260—86)

This invention relates to new diene copolymers and to a method of preparing the same.

It is well known that aliphatic conjugated dienes such as butadiene, isoprene, dimethyl butadiene, piperylene and the like may be polymerized to elastic vulcanizable masses of the general nature of rubber. It is also well known that the properties of these diene synthetic rubber-like materials may be improved appreciably by copolymerizing the diene with one or more other compounds called comonomers which are capable of forming rubber-like copolymers with dienes. Copolymers of dienes with such comonomers as acrylonitrile, styrene, vinyl naphthalene, methyl methacrylate, vinylidene chloride and the like are much more desirable as synthetic rubber than are simple diene polymers and furthermore for many purposes and with respect to many properties these copolymers are superior to natural rubber itself. Consequently rubber-like copolymers of this type, particularly the butadiene acrylonitrile and butadiene styrene copolymers, are finding widespread usage as synthetic rubber and could, if need be, almost wholly replace natural rubber in its multifarious uses.

However, such synthetic rubber is not well suited for the production of many articles now made of natural rubber such as surgical equipment, household supplies and wearing apparel because of its disagreeable odor. Both copolymers of butadiene and styrene and copolymers of butadiene and acrylonitrile as ordinarily produced possess a vile repugnant odor resembling coal oil, which is extremely difficult to remove.

I have now discovered a new class of diene copolymers which are entirely free of any objectionable odor and which therefore are remarkably well suited for uses where the previously known copolymers would be inefficient or objectionable. In fact, the products of this invention are not only free from objectionable odors but quite surprisingly they possess mild fruity pleasing odors which in some cases are reminiscent of delicate perfumes. Moreover, these products possess the characteristic rubber-like properties such as resilience and vulcanizability of other diene copolymers and are also quite resistant to heat and to aging and possess other properties desired in a synthetic rubber.

This new class of copolymers are prepared by copolymerizing a conjugated diene hydrocarbon, such as butadiene, isoprene, dimethyl butadiene and piperylene but preferably butadiene, with a comonomer which is an aromatic ether containing a polymerizable olefinic side chain connected to the aromatic nucleus. The term aromatic ether is used in its broad sense to refer to compounds containing an aromatic radical connected by the ether linkage —O—, to another radical of either the aromatic, aliphatic or cyclic series. The comonomers of this invention, in addition to being aromatic ethers are further characterized in that they contain a polymerizable olefinic side chain connected to an aromatic nucleus. Included in this class of compounds are the alkoxy aryl olefins such as the ortho meta or para methoxy, ethoxy, isopropoxy or propoxy substituted styrenes or the alkoxy substituted vinyl naphthalenes; the aryloxy substituted aryl olefins including naphthoxy and phenoxy compounds such as p-phenoxy styrene; compounds which contain a methylene or ethylene or, in general, an alkylene dioxy radical linked to the olefinic aryl group such as 1 vinyl 3,4 methylene dioxy benzene; and compounds containing alkyl substituents in the olefinic side chain of the aromatic ether such as 1 isopropenyl 4 methoxy benzene (anethole) as well as other compounds of the nature hereinabove set forth. The preferred compounds are the alkoxy substituted aryl olefins, particularly the vinyl benzenes which contain less than 5 carbon atoms in the alkoxy group. Several preferred compounds together with several other familiar compounds included in this class are listed below:

p-methoxy styrene

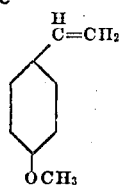

p-ethoxy styrene

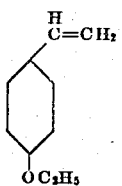

1 vinyl 4 methoxy naphthalene

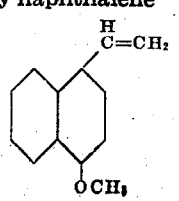

Anethole
(1-isopropenyl 4-methoxy benzene)

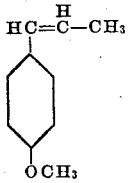

Safrole
(1-isopropenyl 3,4 methylene dioxy benzene)

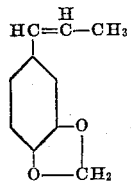

These comonomers which are copolymerized with dienes according to this invention, may be prepared in any of a number of ways such as by the reaction of alkylated phenols with olefin halides in the presence of an aluminum chloride catalyst or they may be obtained from natural sources. Mixtures of olefin-substituted aromatic ethers such as a mixture of O, m and p methoxy styrene may be used in place of the pure compounds if desired. However, it is important that the olefin substituted aromatic ethers contain no phenolic substituents or phenolic impurities since these compounds inhibit the polymerization reaction.

It is also within the scope of this invention to include other diene comonomers such as acrylonitrile, styrenes, methyl methacrylate, vinylidene chloride and the like with the mixture of the diene and the olefin substituted aromatic ether before polymerization, if desired. However, in order to produce a pleasant smelling polymer only relatively small amounts of these other comonomers should be included.

It is generally true in any copolymeric system that the specific properties of the copolymer will vary with the relative proportions of the comonomers and with the method and conditions of polymerization. This is also the case with the copolymers of this invention. For instance, the rubber-like properties of a butadiene p-methoxystyrene copolymer such as elasticity and vulcanizability will be more pronounced when the copolymer contains at least about 50% by weight of butadiene. It is preferred, therefore, when a rubber-like polymer is desired as the product to use from about 50 to 80% by weight of the diene and from about 20 to 50% by weight of the olefin substituted aromatic ether or of a mixture of comonomers including an olefin substituted aromatic ether. However, it is also within the purview of this invention to employ mixtures of dienes with olefin substituted aromatic ethers in all proportions (provided of course that the minor ingredient is introduced in a quantity sufficient to modify appreciably the properties of the product and insure the formation of a true copolymer, this being done usually by as little as 5% by weight) since copolymeric products of useful properties are obtained in each case.

Polymerization of the monomer mixture may be carried out in a homogeneous system or in aqueous emulsion or by any other method of forming polymers. If the homogeneous method of polymerization is used, it is convenient to initiate the polymerization by heating the monomer mixture to a temperature between room temperature and about 100° C., preferably in presence of a substance capable of accelerating the reaction such as a peroxide and in presence of a solvent for the reagents, if desired. When polymerization is complete, which usually requires several days by this method, the polymer is separated from unreacted monomer and/or solvent if these are present and the massive material is then processed in the usual manner.

The most efficient and preferred method of polymerizing the monomer mixtures of this invention, however, is to carry out the reaction in an aqueous emulsion. In this process the mixture of monomers is emulsified with water by means of a suitable emulsifying agent, a polymerization initiator or accelerator is preferably added together perhaps with other substances which activate the accelerator or which otherwise influence the polymerization in a desired manner, and the emulsion is allowed to polymerize by continuously agitating the same at a temperature about 20–60° C. for a time sufficient to complete the reaction, usually from about 15 to 150 hours. The copolymer is obtained in form of an aqueous dispersion resembling natural rubber latex to which an age resistor or antioxidant may be added, if desired, and which may then be utilized as such or coagulated by the same methods used to coagulate natural rubber latex, for example by addition of acid, alcohol or salts or by a combination of these methods. The polymerization products are washed and dried to produce a crude rubber-like material which may then be processed in substantially the same manner as natural rubber.

A large number of materials may be used in the above process to bring about emulsification of the monomer mixture with water. Ordinary soaps such as the sodium or potassium salts of saturated or unsaturated fatty acids, for example, sodium myristate, sodium palmitate and sodium oleate or synthetic soap-like materials such as hymolal sulfates or sulfonates, aromatic sulfonates, and salts of high molecular weight aliphatic bases; for example, sodium lauryl sulfate, sodium naphthalene sulfonate, the hydrochloride of diethylaminoethyloleyl amide and cetyltrimethyl ammonium methyl sulfate, or other emulsifying agents are operable in this invention. A very effective emulsifying solution is one which contains a saturated fatty acid such as myristic acid which has been from about 70 to 95% neutralized with alkali.

An equally large number of substances is available for selection of the polymerization accelerator or catalyst to be employed in the emulsion polymerization process. Substance soluble in either the aqueous phase or non-aqueous phase of the emulsion may be used. Among the polymerization accelerators are the organic and inorganic peroxides such as hydrogen peroxide, diacyl peroxides and benzoyl peroxide, per salts such as alkali metal perborates, persulfates and percarbonates, diazo compounds such as diazoamino benzene and dipotassium diazomethane disulfonate and other substances. Substances which activate or catalyze the action of the polymerization accelerator may also be used therewith. Such compounds as sodium pyrophosphate, sodium oxalate, acetanilide, urea, glycine, myristic acid and the like have been found to act as activators for the peroxide type accelerators. In some instances it may be desirable to add other ingredients to improve the properties of the copolymers or to modify the course of the polymerization. By proper selection of the ingredients going into the aqueous emulsion it is possible to speed up the polymerization and to vary the properties of the polymerization products.

In order to illustrate more clearly the manner in which this invention may be carried out, the following example is cited but it is to be understood that many variations may be effected without departing from the scope of the invention.

*Example.*—Seventy parts by weight of butadiene and 30 parts by weight of a p-methoxy styrene are emulsified with 250 parts of a 2% aqueous solution of myristic acid which has been 85% neutralized with caustic soda. Ten parts of a 3½% solution of hydrogen peroxide, 0.7 part of sodium pyrophosphate and 0.3 part of ferric pyrophosphate are added to accelerate the polymerization. The emulsion is allowed to polymerize by agitation for 56 hours at a temperature of 40° C. Two parts of phenyl beta naphthylamine are added to the latex-like dispersion resulting from the polymerization and the dispersion is coagulated with a mixture of alcohol and salt. The coagulum obtained is a plastic, elastic, tacky material quite similar in appearance to pale crepe rubber. The yield of copolymer obtained is practically quantitative. The copolymer possesses a mild pleasant odor quite dissimilar to the unpleasant odor of a styrene butadiene copolymer. It may be masticated without difficulty and may otherwise be processed in the same manner as natural rubber. When compounded in a typical recipe with sulfur, carbon black, stearic acid, zinc oxide, softener and accelerator, and then vulcanized, excellent vulcanizates are obtained.

Other valuable rubber-like products may be produced by substituting other aromatic ethers of the type disclosed for the p-methoxy styrene in the above example. All of these copolymers may be characterized by their etheral odors.

Since, as has been mentioned above, the particular characteristics of the copolymer depend upon the relative proportions of the comonomers and upon the method and conditions of polymerization, this invention includes a variety of products useful for a number of purposes. The products which are obtained by the copolymerization of monomer mixtures wherein the diene is present to the extent of 40–50% or more by weight are generally useful as rubber substitutes and will find particular usage in the construction of articles where a pleasant odor is especially desirable. They may be compounded with other materials such as other rubber-like or resinous products, pigments, plasticizers, vulcanizing ingredients, antioxidants and the like and may be vulcanized as is natural rubber. It will of course be necessary to select compounding ingredients of such a nature that the desirable odor of the copolymer will not be masked by the odor of the compounding ingredients. In many cases it will be desirable to utilize the copolymer in latex form for the production of dipped goods. Processing, compounding and vulcanizing technique may obviously be varied depending upon the nature of the finished product.

Other products of this invention which result from the copolymerization of monomer mixtures wherein the olefin substituted aromatic ether is present to the extent of about 60% or more by weight are tougher, more thermoplastic and are more difficult to vulcanize. The rubber-like properties are not so pronounced but the desirable odor is still maintained. These products are useful as molding plastics, for coating fabrics and for a number of other purposes.

I claim:
1. The process which comprises copolymerizing a mixture of comonomers including an aliphatic conjugated diene hydrocarbon and an aromatic compound containing an ether oxygen atom directly connected to a carbon atom in the aromatic nucleus and also containing a polymerizable olefinic side chain directly connected to another carbon atom in the aromatic nucleus.

2. The process which comprises copolymerizing a mixture of comonomers including an aliphatic conjugated diene hydrocarbon and an alkoxy substituted aryl olefin wherein the alkoxy substituent is directly connected to a ring carbon atom in the aryl group.

3. The process which comprises copolymerizing a mixture of comonomers including an aliphatic conjugated diene hydrocarbon and an alkoxy substituted aryl olefin wherein the alkoxy substituent is directly connected to a ring carbon atom in the arly group and contains not more than five carbon atoms.

4. The process which comprises copolymerizing a mixture of comonomers including an aliphatic conjugated diene hydrocarbon and an alkoxy substituted vinyl benzene wherein the alkoxy substituent is directly connected to a carbon atom in the benzene ring and contains not more than five carbon atoms.

5. The process which comprises copolymerizing a mixture of comonomers including butadiene and p-methoxy styrene.

6. The process which comprises copolymerizing a mixture of comonomers including butadiene and p-ethoxy styrene.

7. The process which comprises copolymerizing in aqueous emulsion a mixture of comonomers including butadiene and an alkoxy substituted aryl olefin wherein the alkoxy substituent is directly connected to a ring carbon atom in the aryl group.

8. The process which comprises copolymerizing in aqueous emulsion a mixture of comonomers including butadiene and p-methoxy styrene said mixture containing at least 50% by weight of butadiene.

9. The process which comprises copolymerizing in aqueous emulsion a mixture of comonomers including butadiene, p-methoxy styrene and at least one other butadiene comonomer.

10. The process which comprises copolymerizing in aqueous emulsion a mixture of comonomers including butadiene and an alkoxy substituted aryl olefin wherein the alkoxy substituent is directly connected to a ring carbon atom in the aryl group and contains not more than five carbon atoms, said mixture containing at least 50% by weight of butadiene.

11. A copolymer of an aliphatic conjugated diene hydrocarbon and an aromatic compound containing an ether oxygen atom directly connected to a carbon atom in the aromatic nucleus and also containing a polymerizable olefinic side chain directly connected to another carbon atom in the aromatic nucleus.

12. A copolymer of an aliphatic conjugated diene hydrocarbon and an alkoxy substituted aryl olefin wherein the alkoxy substituent is directly connected to a ring carbon atom in the aryl group.

13. A copolymer of an aliphatic conjugated diene hydrocarbon and an alkoxy substituted aryl olefin wherein the alkoxy substituent is directly connected to a ring carbon atom in the aryl group and contains not more than five carbon atoms.

14. A copolymer of an aliphatic conjugated diene hydrocarbon and an alkoxy substituted vinyl benzene wherein the alkoxy substituent is directly connected to a carbon atom in the benzene ring and contains not more than five carbon atoms.

15. A copolymer of butadiene and p-methoxy styrene.

16. A copolymer of butadiene and p-ethoxy styrene.

17. An elastic, vulcanizable copolymer of an aliphatic conjugated diene hydrocarbon and an aromatic compound containing an ether oxygen atom directly connected to a carbon atom in the aromatic nucleus and also containing a polymerizable olefinic side chain directly connected to another carbon atom in the aromatic nucleus.

18. An elastic, vulcanizable copolymer of an aliphatic conjugated diene hydrocarbon and an alkoxy substituted aryl olefin wherein the alkoxy substituent is directly connected to a ring carbon atom in the aryl group.

19. An elastic vulcanizable copolymer of butadiene and an alkoxy substituted aryl olefin wherein the alkoxy substituent is directly connected to a ring carbon atom in the aryl group and contains not more than five carbon atoms.

20. An elastic vulcanizable copolymer of butadiene and p-methoxy styrene.

21. The process which comprises copolymerizing in aqueous emulsion a mixture of comonomers including an aliphatic conjugated diene hydrocarbon and an aromatic compound containing an ether oxygen atom directly connected to a carbon atom in the aromatic nucleus and also containing a polymerizable olefinic side chain directly connected to another carbon atom in the aromatic nucleus.

22. The process which comprises copolymerizing a mixture of comonomers including an aliphatic conjugated diene hydrocarbon and an aromatic compound containing an ether oxygen atom directly connected to a carbon atom in the aromatic nucleus and also containing a polymerizable olefinic side chain directly connected to another carbon atom in the aromatic nucleus, said mixture containing at least 50% by weight of said diene hydrocarbon and at least 20% by weight of said aromatic compound.

FRANK K. SCHOENFELD.

DISCLAIMER 2,306,411.—*Frank K. Schoenfeld*, Silver Lake, Ohio. DIENE COPOLYMERS AND METHOD OF PREPARING SAME. Patent dated December 29, 1942. Disclaimer filed February 2, 1944, by the assignee, *The B. F. Goodrich Company*.

Hereby enters this disclaimer to claims 1 to 5, inclusive, 7, 8, 10 to 15, inclusive, and 17 to 22, inclusive, of said patent.

[*Official Gazette March 7, 1944.*]